US012508205B1

(12) United States Patent
Johnson et al.

(10) Patent No.: US 12,508,205 B1
(45) Date of Patent: Dec. 30, 2025

(54) ACUPRESSURE DEVICE

(71) Applicants: Gary D. Johnson, Kihei, HI (US); Nigel Boyd Chivers, White Rock (CA)

(72) Inventors: Gary D. Johnson, Kihei, HI (US); Nigel Boyd Chivers, White Rock (CA)

( * ) Notice: Subject to any disclaimer, the term of this patent is extended or adjusted under 35 U.S.C. 154(b) by 0 days.

(21) Appl. No.: 19/028,251

(22) Filed: Jan. 17, 2025

(51) Int. Cl.
*A61H 39/04* (2006.01)

(52) U.S. Cl.
CPC ..... *A61H 39/04* (2013.01); *A61H 2201/0153* (2013.01); *A61H 2201/10* (2013.01); *A61H 2201/1676* (2013.01); *A61H 2201/1695* (2013.01)

(58) Field of Classification Search
CPC ............ A61H 39/04; A61H 39/00–086; A61H 2039/005; A61H 1/006; A61H 1/008; A61B 17/122; A61B 17/1227; B25B 5/00; B25B 5/04; B25B 7/00; B25B 7/02; B25B 7/08; D06F 55/00–02
USPC ................... 601/18, 133; D24/200, 211–215
See application file for complete search history.

(56) References Cited

U.S. PATENT DOCUMENTS

| | | | | |
|---|---|---|---|---|
| 2,293,002 A * | 8/1942 | Huffman | B25B 13/28 | 81/321 |
| 4,549,536 A * | 10/1985 | Varjabedian | A61H 39/04 | 606/189 |
| 5,464,413 A * | 11/1995 | Siska, Jr. | A62B 9/06 | 606/208 |
| 5,662,679 A * | 9/1997 | Voss | A61H 39/04 | 606/151 |
| 11,357,695 B1 * | 6/2022 | Reyes | A61H 15/0092 | |
| 2006/0206120 A1 * | 9/2006 | Clawson | A61C 19/05 | 606/151 |
| 2007/0272249 A1 * | 11/2007 | Chandran | A61M 16/20 | 128/206.28 |

(Continued)

FOREIGN PATENT DOCUMENTS

| | | | |
|---|---|---|---|
| CN | 219021179 U * | 5/2023 | |
| CN | 221524575 U * | 8/2024 | E05D 5/02 |

(Continued)

OTHER PUBLICATIONS

Translation of DE 20 2021 104772 (Year: 2021).*
Translation of CN 219021179 (Year: 2023).*

*Primary Examiner* — Paige Kathleen Bugg

(57) ABSTRACT

The present invention discloses an acupressure device. The device comprises a pair of arms, each with a first end portion, a second end portion, and an arm portion comprising concave and convex portions. A fulcrum pivotally connects the arms at their convex portions, enabling outward and inward movement. A spring, positioned between the second end portions, maintains the arms in a closed position when relaxed and allows outward movement to an open position when activated. A pressure band encircles the arms to apply inward pressure. The band's position adjusts to increase pressure when fixed over the concave portion, decrease pressure when fixed over the convex portion, or maintain neutral pressure at intermediate positions. The first end portion incorporates a contact pad assembly, and the second end forms a handle for activating the spring. The pressure band is adjustable after placement to regulate consistent therapeutic pressure on a target acupressure point.

19 Claims, 16 Drawing Sheets

(56) References Cited

U.S. PATENT DOCUMENTS

| | | | | |
|---|---|---|---|---|
| 2011/0270013 | A1* | 11/2011 | Labash | A61H 39/04 600/15 |
| 2013/0072834 | A1* | 3/2013 | Afshar | A61H 23/0263 601/46 |
| 2019/0175442 | A1* | 6/2019 | Henriksson | A61H 21/00 |
| 2020/0237617 | A1* | 7/2020 | Moore | A61H 39/04 |
| 2022/0071842 | A1* | 3/2022 | Short | A61H 39/04 |
| 2022/0183730 | A1* | 6/2022 | Bennett | A61B 17/842 |
| 2024/0189182 | A1* | 6/2024 | Greener | A61H 7/003 |
| 2025/0057726 | A1* | 2/2025 | Arcio | A61H 39/04 |
| 2025/0114273 | A1* | 4/2025 | Gray | A61H 39/06 |

FOREIGN PATENT DOCUMENTS

| | | | | |
|---|---|---|---|---|
| DE | 202021104772 | U1 | * | 11/2021 |
| KR | 20220053090 | A | * | 4/2022 |
| KR | 102740829 | B1 | * | 12/2024 |

* cited by examiner

Section B-B

Section F-F

Section G-G

Section H-H

ACUPRESSURE DEVICE

TECHNICAL FIELD

The present invention generally relates to therapeutic devices. More specifically, the present invention relates to an adjustable acupressure device designed to apply targeted pressure to acupoints on the body for relief from headaches, migraines, and related conditions.

BACKGROUND

Headaches and migraines are prevalent ailments affecting a significant portion of the global population. These conditions severely impact quality of life, productivity, and overall well-being. Traditional treatments often rely on medication, which may lead to undesirable side effects, dependency issues, and may not be suitable for all patients.

Acupressure, an ancient technique rooted in Traditional Chinese Medicine, has shown promise in providing effective relief from headaches by stimulating specific pressure points on the body. Among these points, the LI-4 (Hegu) point, located in the web between the thumb and index finger, is particularly noted for its efficacy in alleviating headache symptoms. However, the consistent and precise application of pressure to this point can be challenging without specialized tools, for example, an acupressure device.

The acupressure device addresses a wide range of symptoms beyond headaches. When applied to the LI-4 (Hegu) point, the device has demonstrated efficacy in alleviating different types of pain in the head and neck regions, including toothaches, neck pain, and eye strain, without the need for drugs or acupuncture needles. Children aged 12 to 16 can safely and easily use this device themselves, particularly in school environments where administering medication such as Tylenol or Advil is prohibited. Additionally, dentists endorse acupressure for its immediate and profound modulation of toothache pain and for use during dental procedures.

Existing acupressure devices often lack adjustability, fail to maintain consistent pressure, or are not designed for extended wear. Further, many of the acupressure devices are not optimized for the specific anatomy of the hand, resulting in discomfort or ineffective treatment. It is an object of the present invention to address these and other shortcomings of the prior art by providing a medical device that delivers consistent and adjustable pressure in a mechanical manner that is economical, efficient, safe, and comfortable for extended use The shortcomings and drawbacks in the prior art as referenced above, are discussed as follows.

U.S. Pat. No. 5,094,227 of Douglas R. Eglauf et al. entitled "non-invasive pain relief apparatus" discloses a medical device, which mechanically applies and maintains pressure to a pressure point to relieve pain. The device includes a locking mechanism to lock an adjustable clamp to a selected position to apply a selected amount of pressure and a fine tuning mechanism to precisely adjust the amount of pressure. A mechanical release and a safety device are also provided to release pressure if the exerted pressure exceeds a safe amount.

U.S. Pat. No. 5,709,647 of Jack Richard Ferber entitled "acupressure device" discloses an acupressure device for stimulating an LI-4 acupressure point located on the back side of a hand within the fleshy crotch between the thumb and index finger. The device comprises an elastic band designed to be worn on the hand. The elastic band includes a first band portion that wraps from the first metacarpal around the palm's heel, encircling the outermost carpal and the lower backhand near the wrist, and returns to the first metacarpal. A second band portion extends from the first metacarpal, wrapping around the palm to the base of the pinkie, encircling the backhand, and returning to the first metacarpal. The first and second band portions are integral at the fleshy crotch between the first and second metacarpals but are separated by a gap at the fifth metacarpal. A pressure nodule, positioned at the integral portion, applies downward pressure on the fleshy crotch due to the band's tension. The first and second band portions develop opposing tensions that stabilize and direct the nodule toward specific hand regions for therapeutic acupressure.

U.S. Pat. No. 5,662,679 of Theodore N. Voss entitled "tragus acupressure clip with over-opening prevention and pressure adjustment" discloses a tragus acupressure clip comprising a concave spring having two opposing jaws. The jaws are separated by an opening of a slot delineated by an inner surface of the concave spring. Two opposing pressure pads are provided, each positioned on an inner surface of the concave spring and separated by the slot. Two mutually non-touching finger tabs are provided, each having one end attached to a different jaw on the outer surface of the spring. Each finger tab has a second end extending along an outer surface of the spring approximately only as far as the portion of the spring opposite the opening separating the jaws. When the second ends of the finger tabs are urged towards each other, against a compression bias of the spring, the slot separating the pressure pads is enlarged. The tragus acupressure clip is not subject to over-opening of the slot which over-opening would otherwise permanently deform the spring.

US20070093867 of Ron Savoia entitled "acupressure treatment device" discloses an acupressure clip for relieving a user's headache pain. A generally U-shaped clip member includes an active arm and a support arm. Each arm meets at a spring portion, and each arm and spring portion include a continuous outside surface, a continuous inside surface, and at least one continuous edge surface. A pressure nub projects from the inside surface of the active arm and extends towards the supporting arm at a point closest to the supporting arm. In use, the clip is positioned on the user's hand between the thumb and the forefinger such that the pressure nub contacts and applies continuous pressure to the LI-4 acupressure point of the person's hand to relieve the person's headache pain. The clip is retained on the hand through friction and the spring force caused by separating the two arms.

USD616559 of Charles Boyer entitled "acupressure device" discloses an ornamental design for the acupressure device.

US20220071842 of Sarah Short entitled "adjustable acupressure clamp" discloses an acupressure clamp configured to provide adjustable pressure for treatment. A U-shaped base comprised of flexible resilient material provides tension for application of pressure through loci on the clamp to the treatment area. A means is provided for adjustably restraining the tension that is applied, thereby enabling user control of the amount of pressure received from the clamp.

US20240189182 of Nicholas Greener entitled "pressure point device" discloses a device and method for providing therapeutic pressure to one or more locations on a user's hand. The device comprising a top portion and bottom portion. Each of the top and bottom portion terminate on a front end in a pressure point surface and each of the top and bottom portion terminate on a rear end in a handle portion.

The existing patent references highlight the evolution of acupressure devices, focusing on portability, adjustability, and user-centric design. While each reference offers valuable insights, existing devices often fail to address the critical need for ergonomic comfort, consistent and variable pressure application, and adaptability to diverse user needs.

Therefore, there is a need for a portable, easy-to-use device that offers consistent and adjustable pressure to the LI-4 point. The device needs to provide a drug-free alternative for headache and migraine relief, benefiting individuals seeking natural pain management solutions, individuals with medication sensitivities, and individuals looking to reduce reliance on pharmaceutical interventions. The device needs to enable the users to control or modify the intensity of pressure for customized comfort of the user. Further, the device needs to provide effective treatment for headache by maintaining consistent pressure on the targeted specific acupressure points. The device needs to be optimized to fit the different anatomy of the hand and provide even pressure distribution on the acupressure point for the comfort of the user.

SUMMARY

The present invention discloses an acupressure device. The device comprises a pair of arms. Each arm comprises a first end portion, a second end portion, and an arm portion extending from the first end portion and the second end portion. The arm portion further comprises a concave portion, a convex portion and an intermediate portion extending between the concave portion and the convex portion.

The device further comprises a fulcrum that extends between the convex portion of the pair of arms and pivotally connects the pair of arms. The fulcrum allows the pair of arms to move outward and inward relative to each other. In one embodiment, the fulcrum is a living hinge.

The device further comprises a spring that extends between the second end portion of the pair of arms. The spring in a relaxed position maintains the arms in a closed position and the spring in an activated position enables movement of the arms outwards and maintains the arms in an open position. In one embodiment, the spring comprises a V-shaped portion having a first end and a second end. The first end is connected to one arm and the second end is connected to another arm.

The device further comprises a pressure management assembly comprising a pressure band. The pressure band is configured to encircle over the pair of arms and apply inward pressure over the arms, thereby biasing the arms toward each other to ensure consistent contact with the target area. The band is configured to fix over the concave portion to increase the inward pressure and the band is configured to fix over the convex portion to decrease the inwards pressure. The band is configured to fix over the intermediate portion for neutral pressure. The band comprises a groove extending along a circumference of an interior surface of the band. The pressure band is configured to slide over the arms to precisely adjust the pressure to predefined pressure levels.

The first end portion comprises a contact pad assembly and the second end portion defines a handle of the device. The handle enables a user to apply pressure at the second end portion of the arms to activate the spring to move the arms to an open position to fix over a desired pressure point. When application of the device is not in use or engaged, the band can be adjusted to manage pressure at the various pressure points. In one embodiment, an exterior surface of the handle comprises a textured surface, which is a non-slip grip that enhances control and stability during operation.

The pressure management assembly further comprises one or more protruding members including a set of first protruding members and a set of second protruding members. The first protruding members are arranged from the intermediate portion to a portion of the concave portion and the second protruding members are arranged from the intermediate portion to a portion of the convex portion. When the band is disposed over the protruding member to manage application of pressure, the groove of the band is configured to securely engage with the protrusion member.

In one embodiment, the first protruding members comprises a side surface having a flat configuration and the second protruding members comprises a top surface having a rounded configuration. When the band is disposed over spaces between the first protruding members to manage application of pressure, the flat configuration of the first protruding member is configured to prevent movement of the band.

In one embodiment, the contact pad assembly comprises a first support member disposed over the first end portion of respective arms. The contact pad assembly further comprises a second support member comprising a cylindrical member. The cylindrical member comprises a first hollow inner portion and at least two parallel slits that extend from one end of the cylindrical member. The first hollow inner portion is complementary to the first support member. The second support member is locked over the first support member by sliding the cylindrical member over the first support member. An exterior surface of the cylindrical member comprises one or more spaced apart ribs extending along a length of the cylindrical member. The contact pad assembly further comprises a contact pad comprising a second hollow inner portion complementary to the cylindrical member of the second support member. The second hollow inner portion fixed over the cylindrical member to lock the contact pad with the second support member. The contact pads are detachably attached to the first end portion of the arms for the contact pads to be easily interchanged by the user. This configuration can be easily interchanged by the user based on their preferences, with options including materials such as jade, colored glass, magnetic hematite, or other suitable materials to enhance functionality and aesthetic appeal.

In another embodiment, the contact pad assembly comprises a third support member disposed over the first end portion of respective arms. The third support member comprises a cylindrical portion and plurality of collapsible fins extending from an exterior surface of the cylindrical portion. The contact pad comprising the second hollow inner portion is configured to lock the contact pad with the third support member. This configuration similarly allows the contact pads to be easily interchanged by the user based on their preferences, with options including materials such as jade, colored glass, magnetic hematite, or other suitable materials to enhance functionality and aesthetic appeal.

In one embodiment, the first end portion is integrally connected to the concave portion of respective arm. In another embodiment, the device further comprises at least one first connecting member configured to connect the first end portion to the concave portion of one arm and at least one first connecting member configured to connect the first end portion to the concave portion of another arm. In one embodiment, the first connecting member is a cylindrical connecting member. The cylindrical connecting member is a living hinge configured to pivot 360-degrees to enable the contact pad to adjust seamlessly to the user's hand contours.

In another embodiment, the device further comprises at least one second connecting member configured to connect the first end portion to the concave portion of one arm and at least one second connecting member configured to connect the first end portion to the concave portion of another arm. In another embodiment, the second connecting member is a rectangular connecting member configured to connect the first end portion to the concave portion of respective arm to enable controlled back-and-forth pivoting of the contact pads along a single axis ensuring precise alignment during use.

In another embodiment, the device further comprises a first leg and a second leg. The first leg extends from an interior surface of the second end portion of one arm and first end of the spring. The second leg extends from an interior surface of the second end portion of another arm and second end of the spring. The first leg lies in a first plane and the second leg lies in a second plane. The first plane is adjacent to the second plane so that a portion of first leg abuts against a portion of the second leg. The first plane is adjacent to the second plane so that a portion of first leg is oriented towards or aligned with the second leg. The first leg and the second leg are made of flexible material. The first leg, the second leg and the spring together forms a closed loop. At least one of the first leg and the second leg flexes to receive a keyring over the legs and releases to lock the first leg and second leg, securing the keyring within the closed loop, allowing for portability of the device on a keychain.

In one embodiment, the first leg and the second leg comprise one or more guiding protrusions. In one embodiment, the second end portion of the arms and the contact pad comprise one or more ribs molded directly on the nylon body. In one embodiment, the pressure band is made of silicone material and the spring is made of nylon material. In another embodiment, the pressure band is made of silicone material and the device is substantially made of nylon material. The device further comprises visual markings on the nylon body aligned with the adjustable pressure mechanism to indicate defined pressure levels based on the silicone ring's position. In another embodiment, the device further comprises an alternative pivoting hinge mechanism for the contact pads. The hinge allows back-and-forth motion along a single axis, ensuring precise alignment and consistent therapeutic pressure application on the contact pad.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
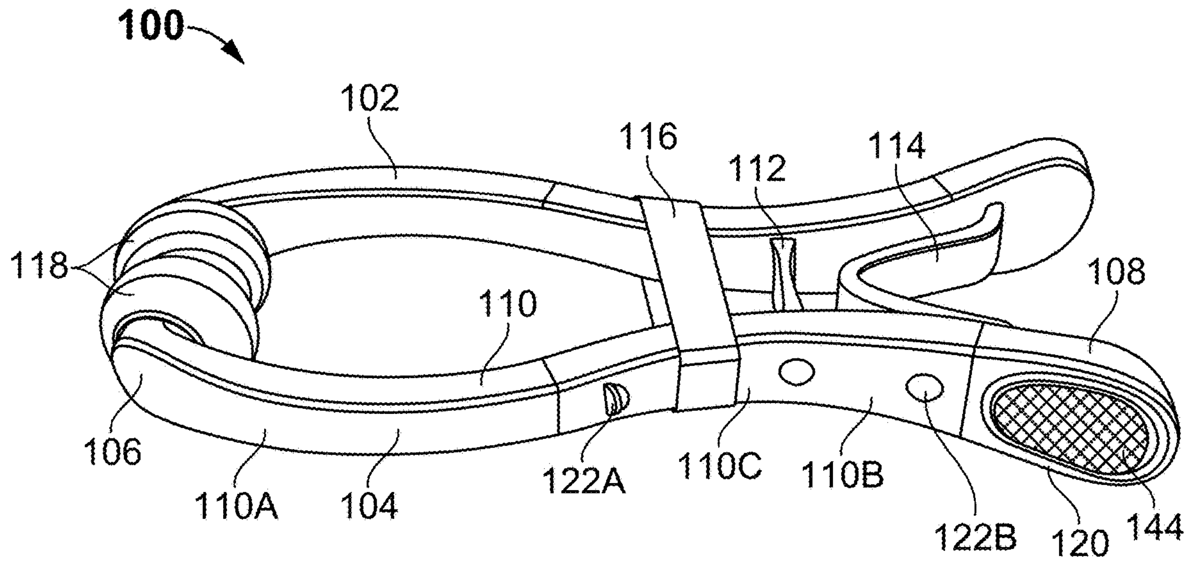
FIG. 1 exemplarily illustrates a perspective view of an acupressure device, according to an embodiment of the present invention.
Figure 2:
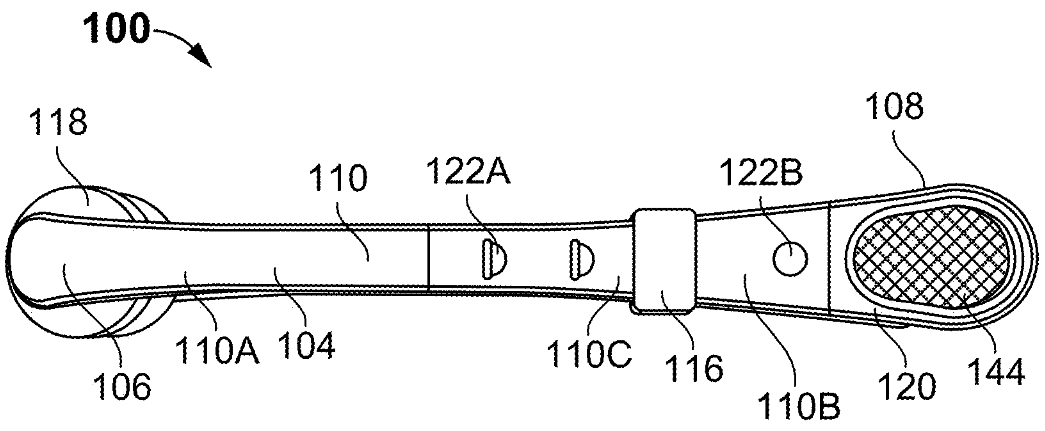
FIG. 2 exemplarily illustrates a side view of the acupressure device of FIG. 1.

Referring to FIG. 1 and FIG. 2, an acupressure device 100 comprises a pair of arms (102, 104) pivotally connected to each other. Each arm (102, 104) comprises a first end portion 106, a second end portion 108, and an arm portion 110. The arm portion 110 extends between the first end portion 106 and the second end portion 108. The arm portion 110 comprises a concave portion 110A and a convex portion 110B.

The acupressure device 100 further comprises a fulcrum 112 extending between the convex portion 110B of the pair of arms (102, 104). The fulcrum 112 is configured to pivotally connect the pair of arms (102, 104). The fulcrum 112 is configured to allows the pairs of arms (102, 104) to move outward and inward relative to each other. In one embodiment, the fulcrum 112 is a living hinge. The fulcrum 112 enhances flexibility and ensures the arms (102, 104) move smoothly while maintaining consistent pressure.

The acupressure device 100 further comprises a spring 114 that extends between the second end portion 108 of the pair of arms (102, 104). The spring 114 is configured to move between a relaxed position and an activated position. The spring 114 in the relaxed position maintains the arms (102, 104) in a closed position and the spring 114 in the activated position enables movement of the arms (102, 104) outwards and maintains the arms (102, 104) in an open position. The spring 114 comprises a V-shaped portion having a first end and a second end. The first end is connected to one arm 102 and the second end is connected to another arm 104. The spring 114 contributes to controlled compression during use, enhancing overall functionality and adaptability of the device 100. In one embodiment, the spring 114 is of nylon provides consistent baseline pressure to the target point. The baseline of spring 114 compression adapts naturally to a user movement, maintaining therapeutic pressure without requiring constant readjustment.

The acupressure device 100 further comprises a pressure management assembly comprising a pressure band 116. The pressure band 116 is configured to encircle over the pair of arms (102, 104) and apply inward pressure over the arms (102, 104), thereby biasing the arms (102, 104) toward each other to ensure consistent contact with the target area. The pressure band 116 is configured to fix over the concave portion 110A to increase the inward pressure and the pressure band 116 is configured to fix over the convex portion 110B to decrease the inwards pressure. In one embodiment, the pressure band 116 is an adjustable silicon band. The silicone material provides a tactile, comfortable surface and allows smooth movement along the device 100.

The acupressure device 100 further comprises a contact pad assembly at the first end portion 106. The contact pad assembly comprises contact pads 118. The contact pads 118 is configured to apply consistent pressure to a LI-4 (Hegu) pressure point. The LI-4 (Hegu) pressure point is located between a thumb and an index finger of a hand. In one embodiment, the LI-4 (Hegu) pressure point is a hand valley point. In one embodiment, the contact pad 118 is a magnetized hematite pad. The magnetized hematite pads enhance therapeutic application through consistent placement and optional magnetic properties. In one embodiment, the contact pads 118 is detachably attached to the first end portion 106. This configuration allows the contact pads to be easily detached and interchanged by the user based on their preferences, with options including materials such as jade, colored glass, magnetic hematite, or other suitable materials to enhance functionality and aesthetic appeal.

The acupressure device 100 further comprises a handle 120. The second end portion 108 defines the handle 120. The handle 120 enables a user to apply pressure at the second end portion 108 of the arms (102, 104) to activate the spring 114 to move the arms (102, 104) to an open position to fix over a desired pressure point, wherein, after application of the device 100, the pressure band 116 is adjusted to manage pressure at the pressure point. The pressure band 116 is also referred as band 116 throughout this document. In one embodiment, the handle 120 comprises a textured surface 144. The textured surface 144 is non-slip grip that enhances control and stability during operation. In one embodiment, the oversized handles 120 are configured to provide increased mechanical advantage, making it easier for users, especially those with weak or impaired hands, to install or remove the device 100 even under tight pressure settings. The handles 120 facilitate a user control and allow precise adjustments of the clamping pressure.

Referring to FIG. 1 to FIG. 5, the pressure management assembly further comprises one or more protruding members (122A, 122B). The protruding members (122A, 122B) comprises a set of first protruding members 122A and a set of second protruding members 122B. The arrangement of the protruding members (122A, 122B) along arm portion 110 serves as pressure stations for the band 116. The arm portion 110 further comprises an intermediate portion 110C connecting the concave portion 110A and the convex portion 110B. The first protruding members 122A are arranged from the intermediate portion 110C to a portion of the concave portion 110A. The second protruding members 122B are arranged from the intermediate portion 110C to a portion of the convex portion 110B. The intermediate portion 110C is a neutral pressure zone. The portion of the arms (102, 104) extending from intermediate portion 110C towards concave portion 110A is a positive pressure zone and portion of the arms (102, 104) extending from intermediate portion 110C towards convex portion 110B is a negative pressure zone.

Figure 3:
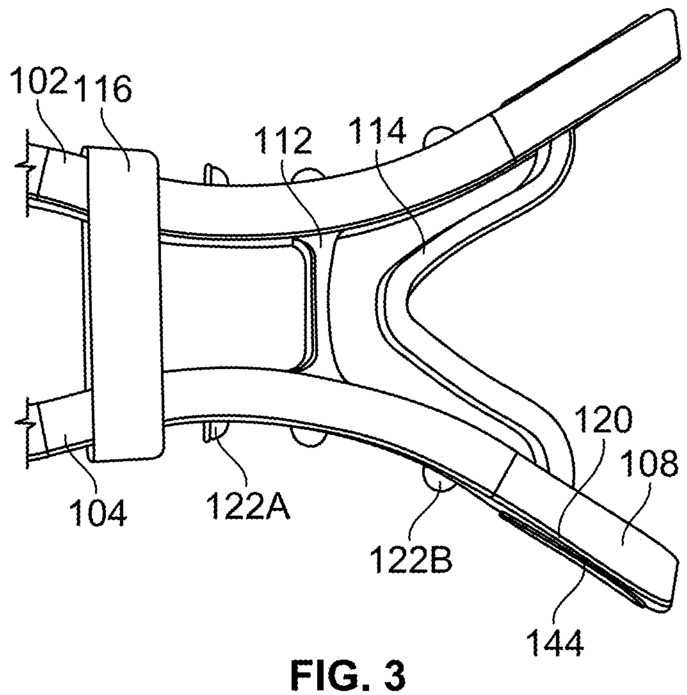
FIG. 3 exemplarily illustrates a pressure band positioned at a positive pressure zone of an adjustable pressure zone, according to an embodiment of the present invention.
Figure 4:
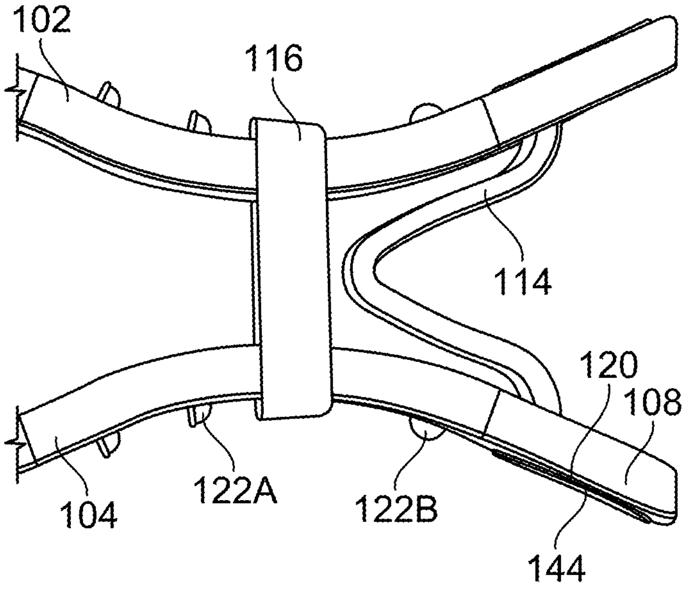
FIG. 4 exemplarily illustrates the pressure band positioned at a neutral pressure zone of the adjustable pressure zone, according to an embodiment of the present invention.
Figure 5:
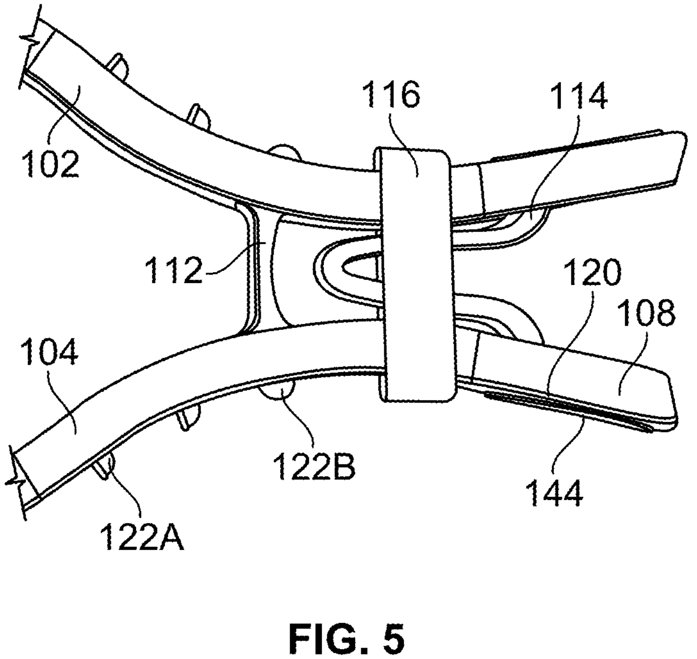
FIG. 5 exemplarily illustrates the pressure band positioned at a negative pressure zone of the adjustable pressure zone, according to an embodiment of the present invention.

Referring to FIG. 3, the pressure band 116 is positioned at the positive pressure zone. The pressure station at the first protruding members 122A towards the convex portion 110B referred as the positive pressure zone. The band 116 positioned at the positive pressure zone increases clamping pressure. Referring to FIG. 4, the pressure band 116 is positioned at the neutral pressure zone. The pressure station at the second protruding members 122B near the spring 114 is referred as the neutral pressure zone for the band 116. The band 116 positioned at the neutral pressure zone provides balanced clamping pressure. Referring to FIG. 5, the pressure band 116 is positioned at the negative pressure zone. The pressure station at the second protruding members 122B at end of the second end portion 108 is referred as the negative pressure zone for the band 116. The band 116 positioned at the negative pressure zone reduces clamping pressure.

Figure 6:
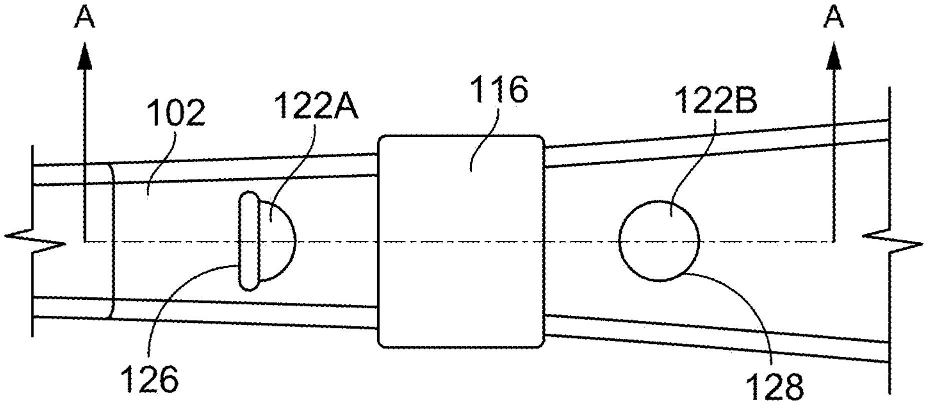
FIG. 6 exemplarily illustrates the pressure band positioned over at least one protrusion member, according to an embodiment of the present invention.
Figure 7:
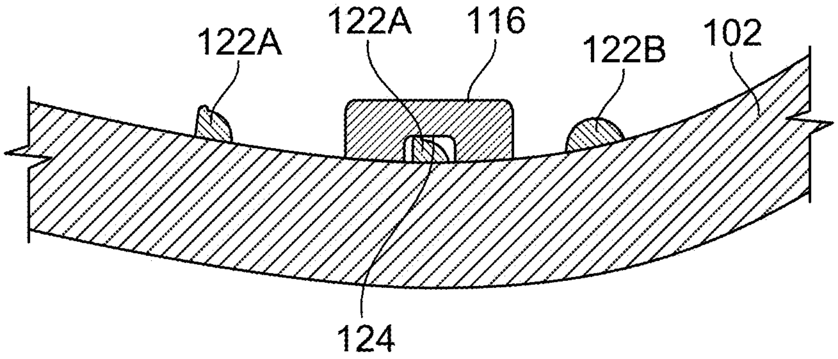
FIG. 7 exemplarily illustrates a cross-sectional view of the pressure band positioned over the protrusion member of FIG. 6 along a section A-A.

Referring to FIG. 6 and FIG. 7, the pressure band 116 is positioned above the first protrusion member 122A. The pressure band 116 comprises a groove 124 extending along a circumference of an interior surface of the band 116. When the band 116 disposed over the protruding member (122A, 122B) to manage application of pressure, the groove 124 of the band 116 is configured to lock with the protrusion member (122A, 122B). In one embodiment, the pressure band 116 positioned on the second-highest pressure point enables to deliver enhanced therapeutic pressure for more effective relief. The second-highest pressure point is between the set of first protruding members 122A and the set of second protruding members 122B. Further, the pressure band 116 can be adjusted up to nine levels to regulate the pressure applied to the LI-4 (Hegu) pressure point. The nine levels of pressure are regulated by placing the pressure band 116 in front or behind the protruding member (122A, 122B), in between the protruding member (122A, 122B) and over the protruding member (122A, 122B). The pressure band 116 is adjusted to a user desired pressure level. The pressure band 116 is adjusted to fit the hand anatomy of the different users.

Figure 8:
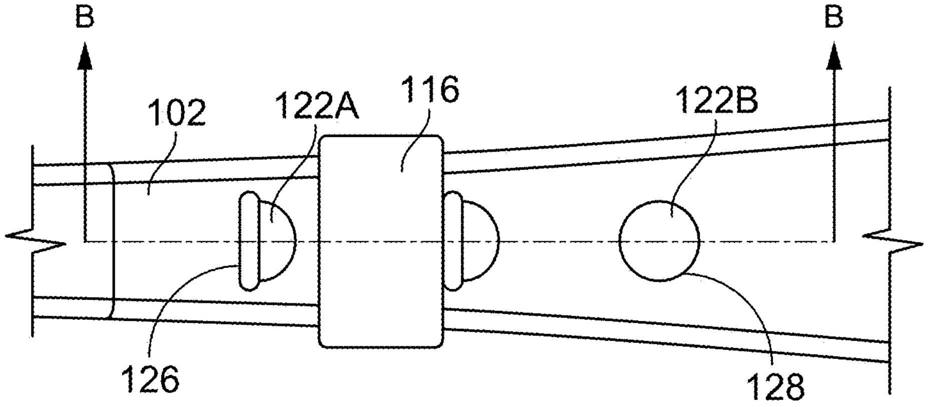
FIG. 8 exemplarily illustrates the pressure band positioned in between the protrusion members, according to an embodiment of the present invention.
Figure 9:
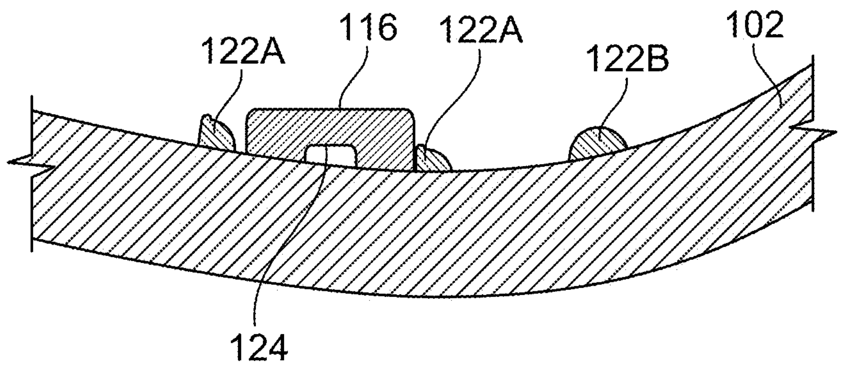
FIG. 9 exemplarily illustrates a cross-sectional view of the pressure band positioned in between the protrusion members of FIG. 8 along a section B-B.
Figure 10:
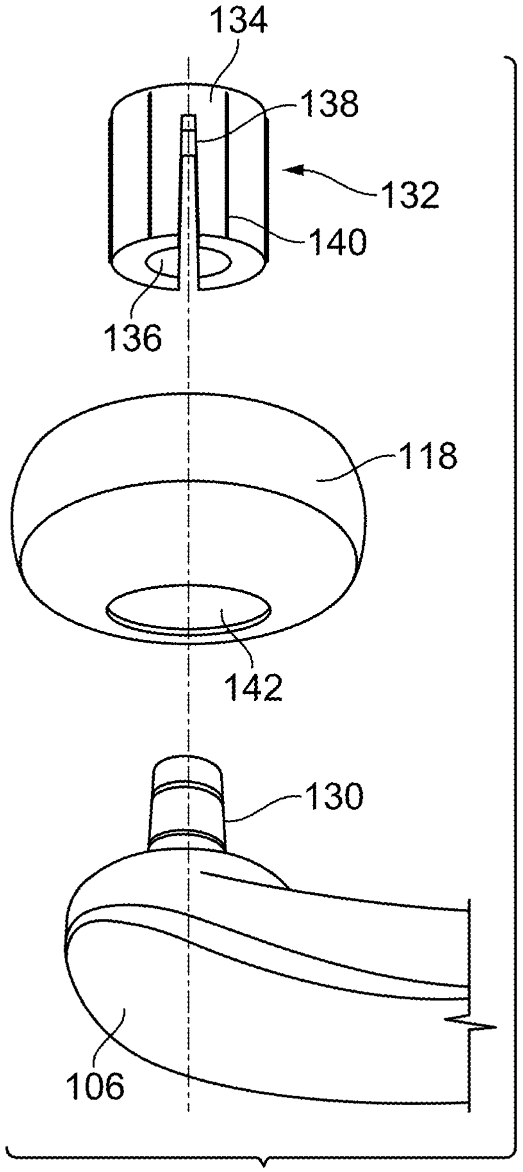
FIG. 10 exemplarily illustrates an exploded view of contact pad assembly, a first support member and a second support member, according to an embodiment of the present invention.
Figure 11:
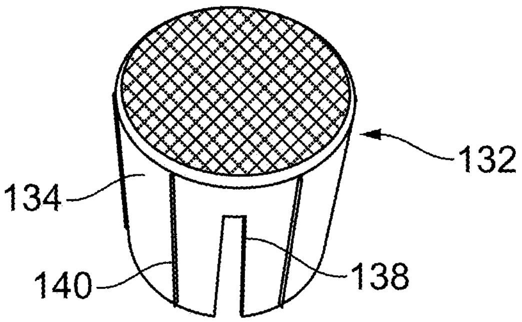
FIG. 11 exemplarily illustrates a top perspective view of the first support member, according to an embodiment of the present invention.
Figure 12:
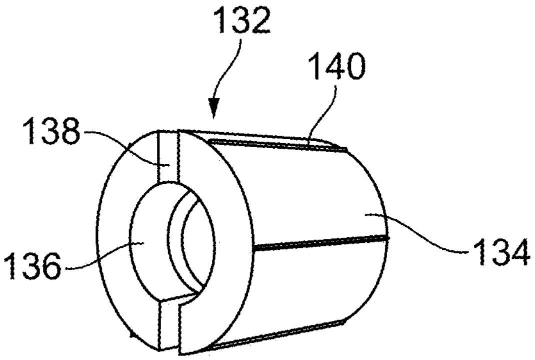
FIG. 12 exemplarily illustrates a perspective view of the second support member of FIG. 11.
Figure 13:
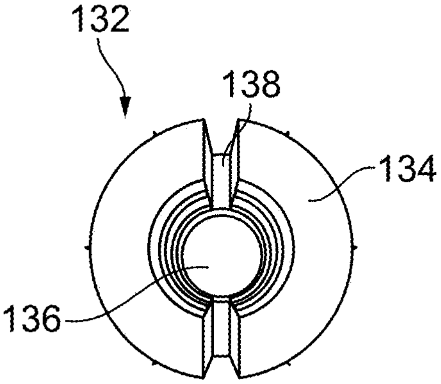
FIG. 13 exemplarily illustrates a bottom view of the second support member of FIG. 11.

Referring to FIG. 8 and FIG. 9, the pressure band 116 is positioned between the first protrusion members 122A. In one embodiment, the first protruding members 122A comprises a side surface having a flat configuration 126 and the second protruding members 122B comprises a top surface having a rounded configuration 128. The flat configuration 126 of the first protruding member 122A is configured to prevent movement of the band 116, when the band 116 is disposed over the space between the first protruding members 122A to manage application of pressure.

Referring to FIG. 10 to FIG. 13, the contact pad assembly comprises a first support member 130, a second support member 132, and the contact pad 118. The first support member 130 disposed over the first end portion 106 of respective arms (102, 104). The second support member 132 comprises a cylindrical member 134 having a first hollow inner portion 136 and at least two parallel slits 138 extend from one end of the cylindrical member 134. The first hollow inner portion 136 is complementary to the first support member 130. The second support member 132 is locked over the first support member 130 by sliding the cylindrical member 134 over the first support member 130. Further, an exterior surface of the cylindrical member 134 comprises one or more spaced apart ribs 140 extending along a length of the cylindrical member 134. Further, the top surface of the cylindrical member 134 comprises a non-slip textured top surface that enhances the grip to prevent movement of the contact pads 118. The non-slip texture top surface ensures secure pressure application across varying pressure levels. The contact pad 118 comprising a second hollow inner portion 142 complementary to the cylindrical member 134 of the second support member 132. The second hollow inner portion 142 fixed over the cylindrical member 134 to lock the contact pad 118 with the second support member 132. Additionally, the contact pad 118 interacts with the user's hand to apply consistent pressure to the targeted LI-4 (Hegu) acupressure point and ensures effective operation.

Figure 14:
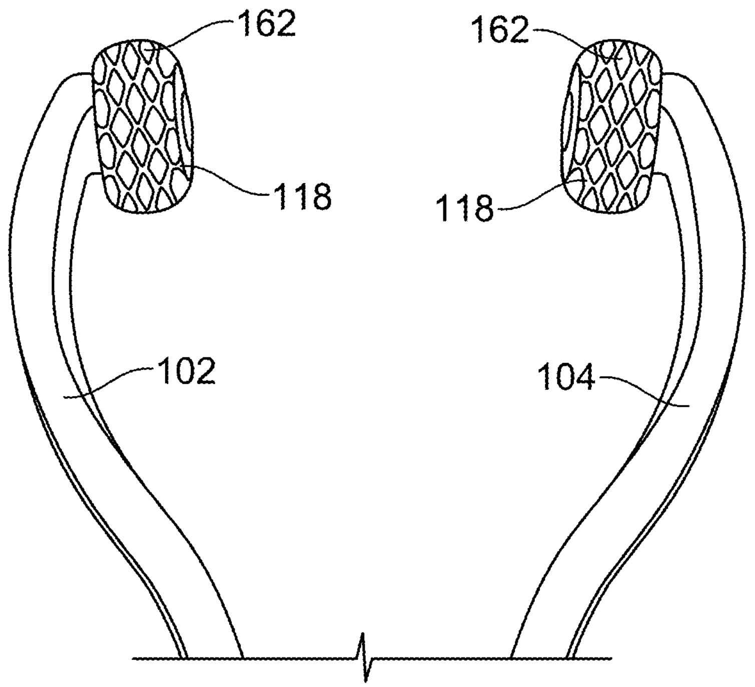
FIG. 14 exemplarily illustrates a contact pad assembly of the acupressure device, according to another embodiment of the present invention.

Referring to FIG. 14, in one embodiment, the contact pads 118 comprise a faceted texture 162. The faceted texture 162 provides an anti-slip surface that ensures secure pressure application across varying pressure levels. The faceted texture 162 enhances the anti-slip characteristics during use of the device 100 on the hand.

Figure 15:
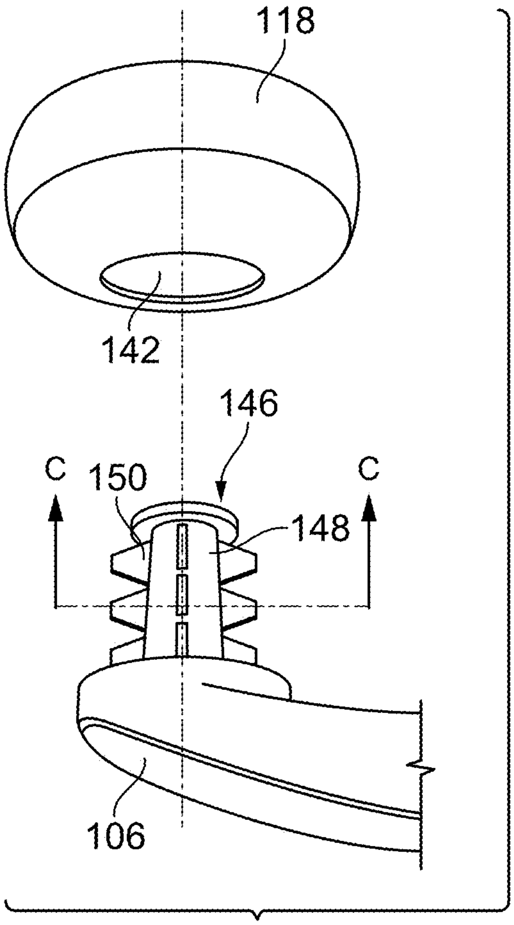
FIG. 15 exemplarily illustrates an exploded view of the contact pad assembly of the acupressure device, according to another embodiment of the present invention.
Figure 16:
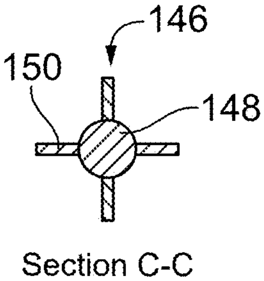
FIG. 16 exemplarily illustrates a cross-section of a third support member of the contact pad assembly of FIG. 15 along a section C-C.

Referring to FIG. 15 and FIG. 16, the contact pad assembly comprises a third support member 146 and the contact pad 118. The third support member 146 is disposed over the first end portion 106 of respective arms (102, 104). The third support member 146 comprises a cylindrical portion 148 and plurality of fins 150 extending from an exterior surface of the cylindrical portion 148. The fins 150 collapse inward under pressure which allows the third support member 146 to secure the contact pads 118 to the cylindrical portion 148. Further, the fins 150 are configured to firmly lock the contact pads 118 in place. The contact pad 118 comprising the second hollow inner portion 142 is configured to lock the contact pad 118 with the third support member 146. In one embodiment, the cylindrical portion 148 is an integral built-in cap with a textured surface to enhance grip and prevent slippage. The attachment of cap ensures secure assembly and stability during use of the device 100.

Figure 17:
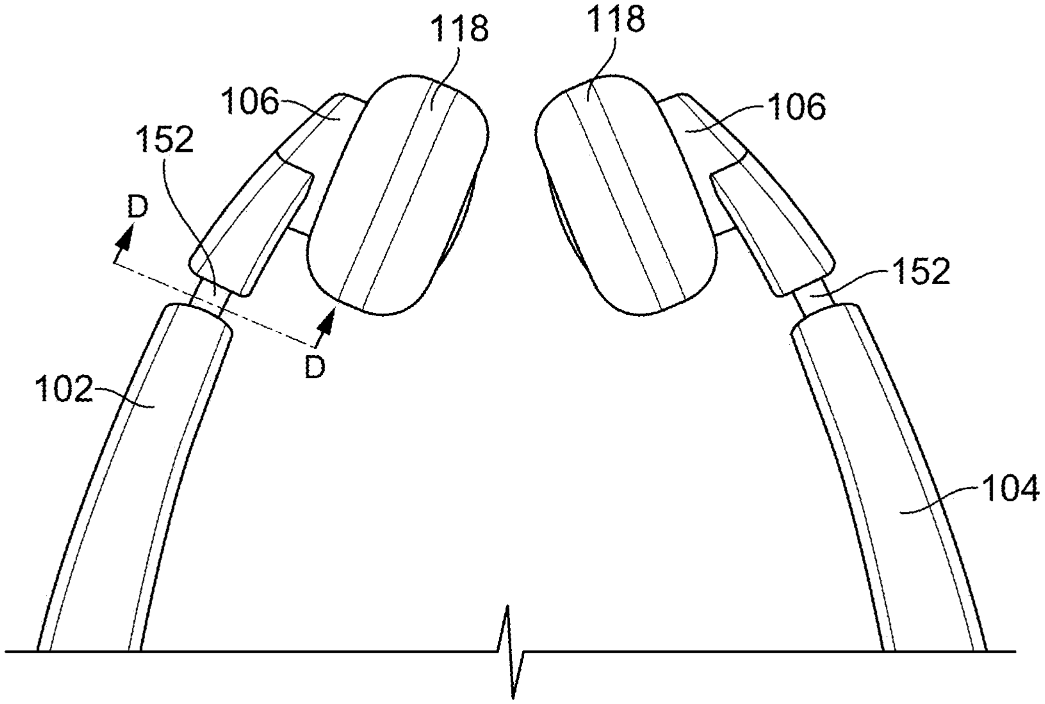
FIG. 17 exemplarily illustrates a first end portion of the arms connected to the concave portion of the arms via a first connecting member, according to an embodiment of the present invention.
Figure 18:
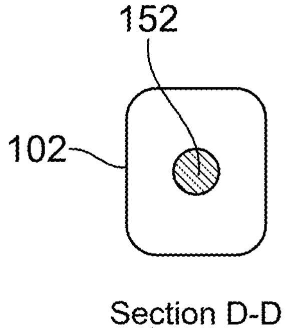
FIG. 18 exemplarily illustrates a cross-section of the first connecting member of FIG. 17 along a section D-D.
Figure 19:
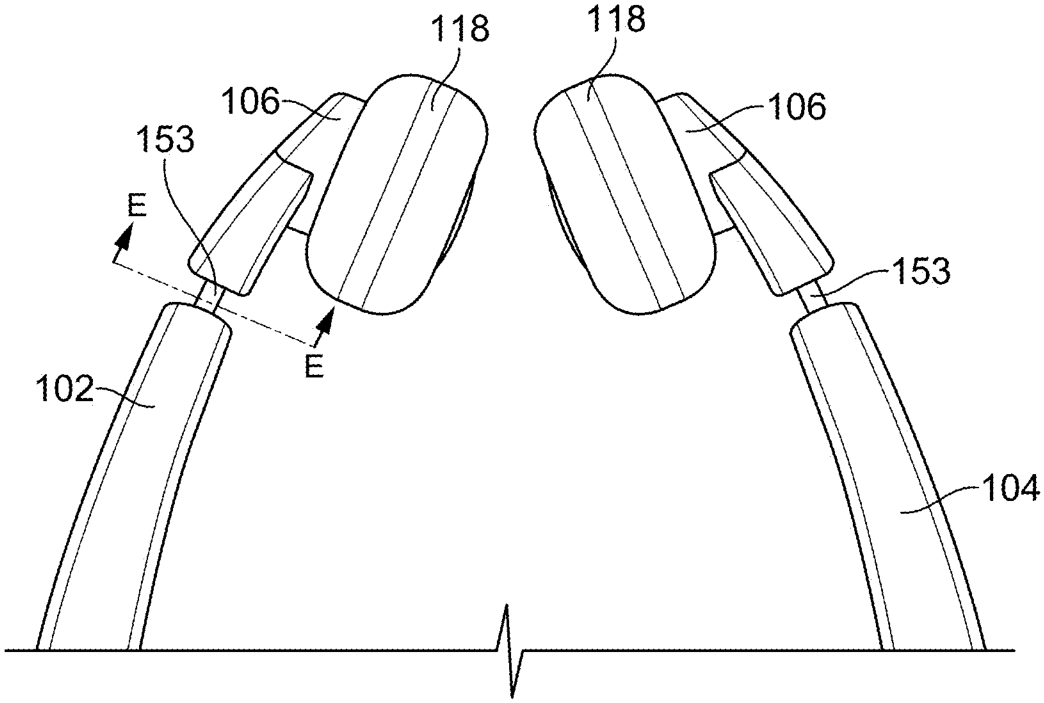
FIG. 19 exemplarily illustrates a first end portion of the arms connected to the concave portion of the arms via a second connecting member, according to another embodiment of the present invention.
Figure 20:
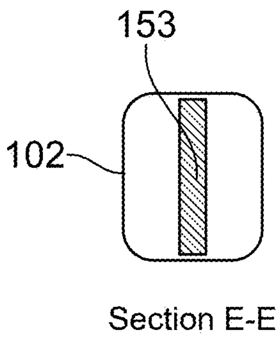
FIG. 20 exemplarily illustrates a cross-section of the second connecting member of FIG. 19 along a section E-E.

Referring to FIG. 1 and FIG. 2, the first end portion 106 is integrally connected to the concave portion 110A of respective arm (102, 104). Referring to FIG. 17 to FIG. 20, a first connecting member 152 is configured to connect the first end portion 106 to the concave portion 110A of respective arm (102, 104). The first connecting member 152 allows the contact pads 118 to pivot 360-degrees, enabling them to adjust seamlessly to the user's hand contours. Referring to FIG. 17 and FIG. 18, the first connecting member 152 comprises a cylindrical configuration. Referring to FIG. 19 and FIG. 20, a second connecting member 153 comprises a rectangular configuration. The second connecting member 153 is configured to connect the first end portion 106 to the concave portion 110A of respective arm (102, 104). The second connecting member 153 is designed to enable controlled back-and-forth pivoting of the contact pads 118 along a single axis. Unlike the 360-degree pivoting mechanism of the first connecting member 152, the second connecting member 153 restricts motion to a single plane, ensuring precise alignment during use. The first and second connecting members (152, 153) provide predictable movement, ideal for users requiring focused application on target point.

Referring to FIG. 1 and FIG. 2, the sliding silicone band 116 with a circumferential groove 124 interacts with protruding member 122A and 122B on the nylon body to provide precise and reproducible pressure adjustments. The integrated nylon spring 114 ensures consistent baseline pressure is applied to the LI-4 point during use. The fulcrum 112 crossbar allows for precise alignment of the arms (102, 104) of the device 100, maintaining proper contact with the LI-4 point.

Figure 21:
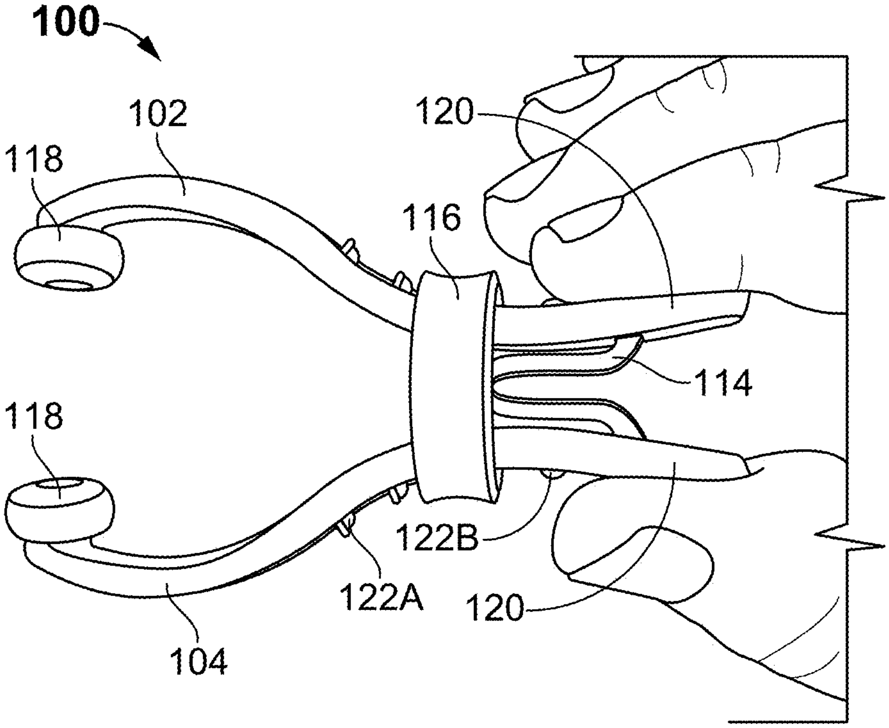
FIG. 21 exemplarily illustrates a user applying pressure on a second end portion of the pairs of arms to open the pairs of arms, according to an embodiment of the present invention.
Figure 22:
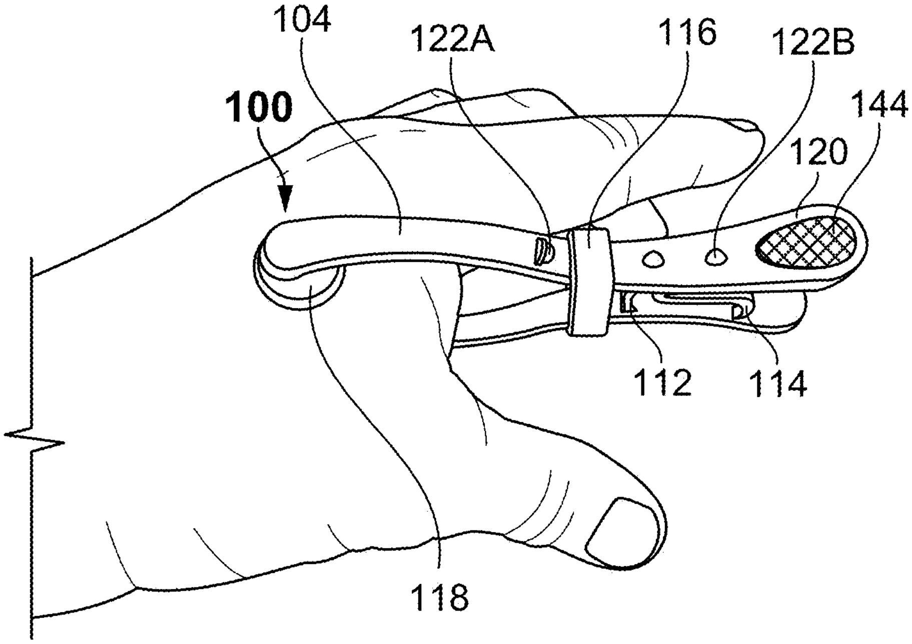
FIG. 22 exemplarily illustrates the acupressure device positioned between the index finger and the thumb, according to an embodiment of the present invention.
Figure 23:
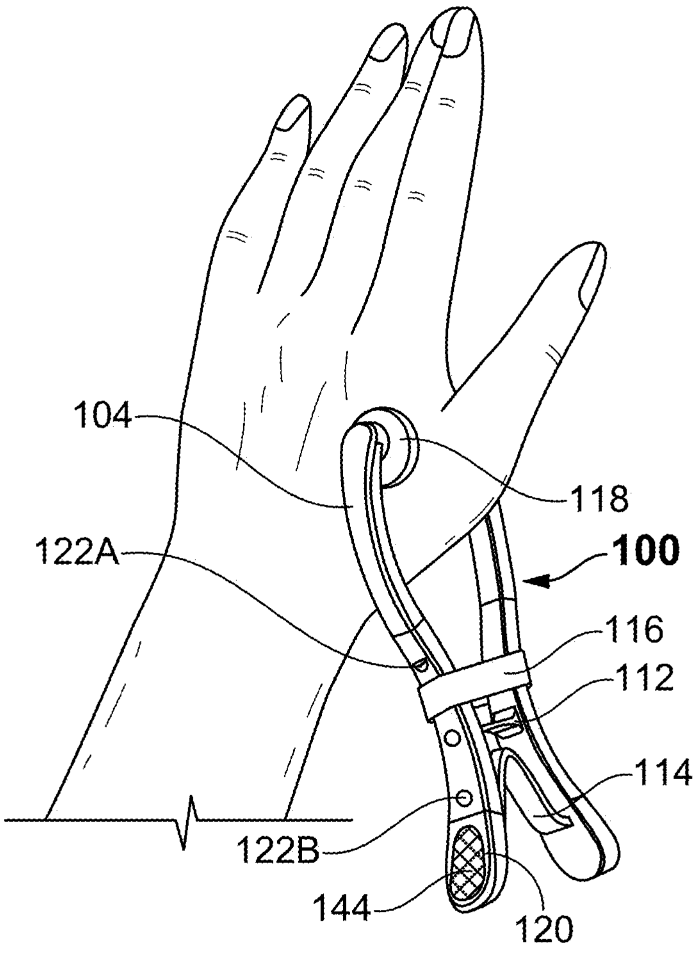
FIG. 23 exemplarily illustrates the acupressure device positioned posterior to the thumb, according to an embodiment of the present invention.

Referring to FIG. 21 to FIG. 23, the operation of the acupressure device 100 is disclosed. The user simultaneously applies pressure on the second end portions 108 of the pair of arms (102, 104) using the index finger and thumb. The pressure applied on the second end portions 108 of the pair of arms (102, 104) activates the arms (102, 104) to move outwards and maintains the arm (102, 104) in the open position. The open position of the device 100 compresses the spring 114 and allows the band 116 to be fixed over the convex portion 110B to decrease the inward pressure. The compressed spring 114 and the decrease in the inward pressure ensures the device 100 is comfortably aligned with the LI-4 (Hegu) acupressure point before releasing the second end portions 108 of the pair of arms (102, 104). The pressure applied on the LI-4 (Hegu) acupressure point is adjusted to the user preferences by positioning the band 116 on or in between the set of first protruding members 122A and the set of second protruding members 122B. Further, the user needs to adjust the band 116 over the concave portion 110A for increased pressure. The user needs to adjust the band 116 over the convex portion 110B for decreased pressure. Once the band 116 is adjusted, the band 116 is securely positioned to maintain consistent pressure on the targeted specific acupressure points. Referring to FIG. 22, in one embodiment, the device 100 is positioned between the index finger and the thumb. Referring to FIG. 23, in one embodiment, the device 100 is positioned proximal and slightly posterior to the thumb, providing the user greater flexibility to perform tasks and activities.

Figure 24:
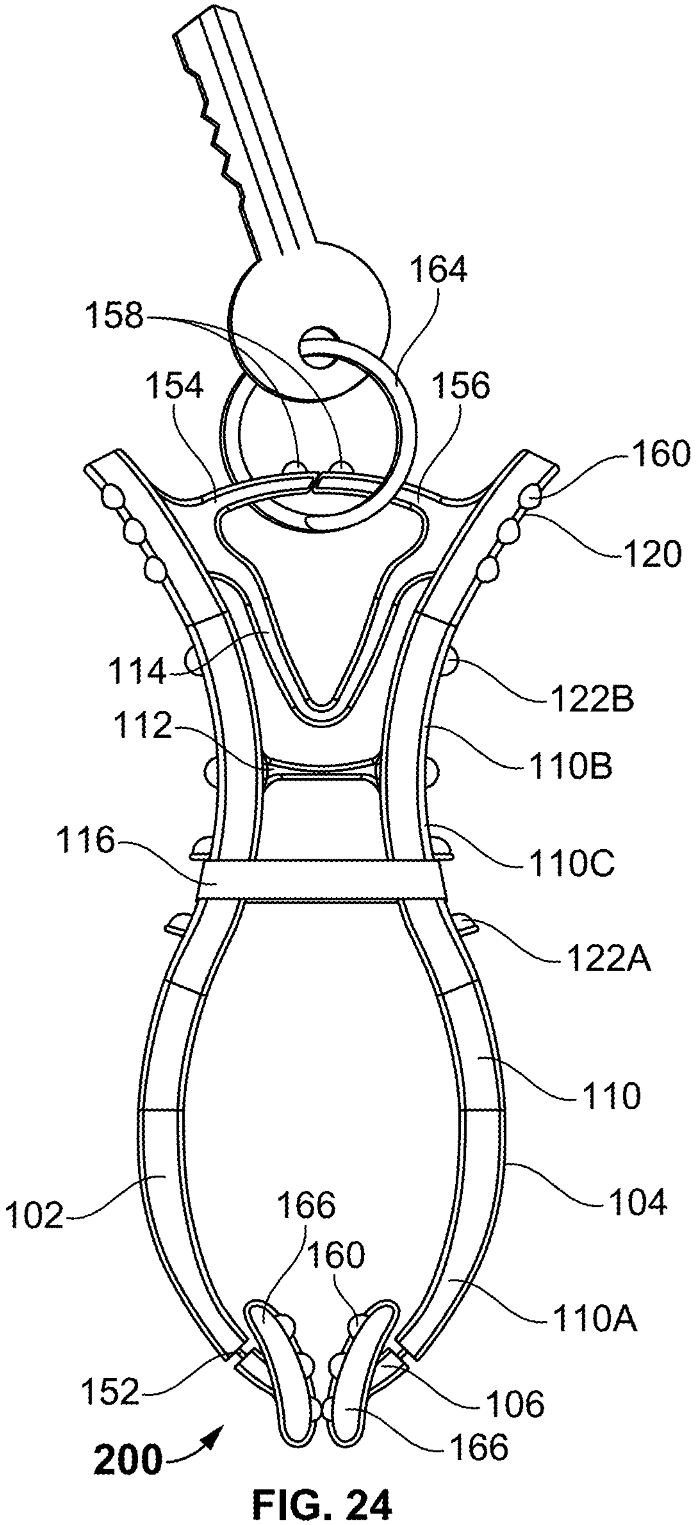
FIG. 24 exemplarily illustrates a perspective view of an acupressure device, according to another embodiment of the present invention.
Figure 25:
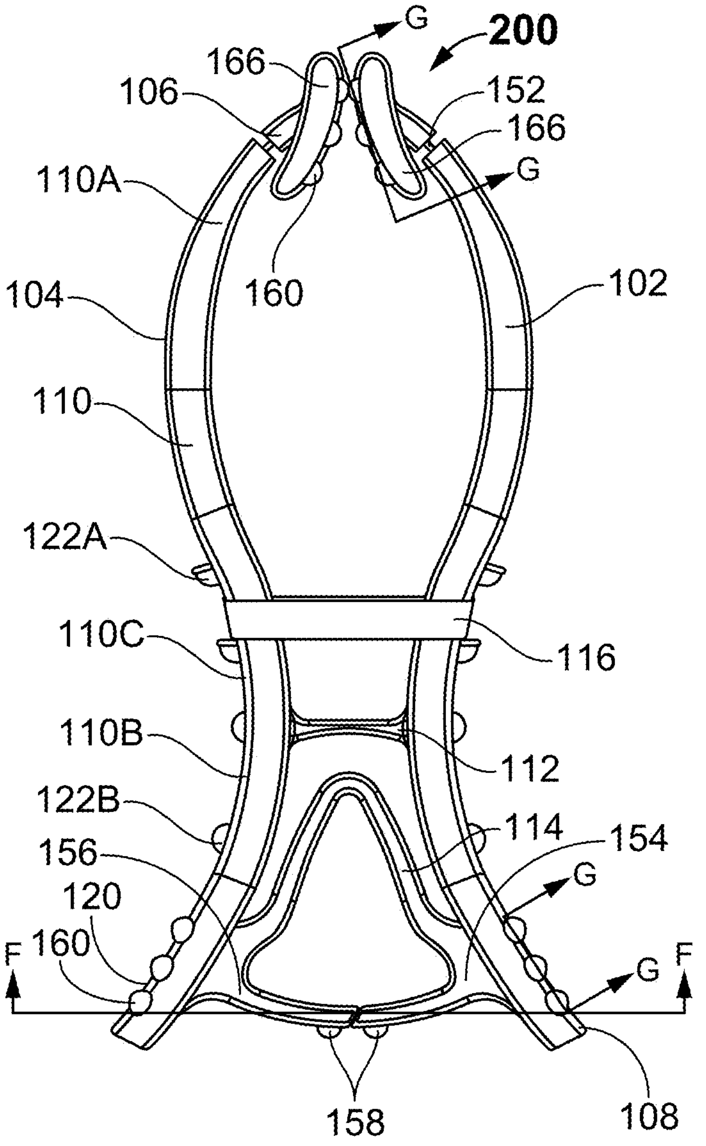
FIG. 25 exemplarily illustrates a top view of the acupressure device of FIG. 24.
Figure 28:
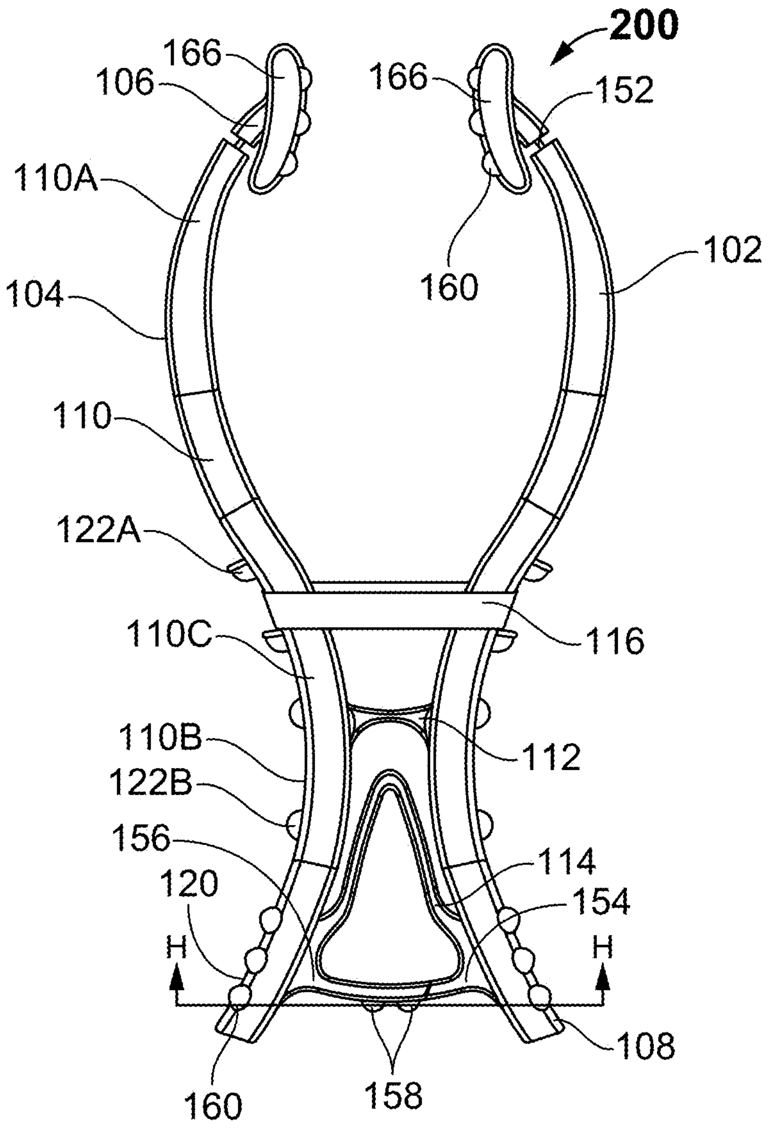
FIG. 28 exemplarily illustrates a perspective view of the acupressure device of FIG. 24 in open position.

Referring to FIG. 24, FIG. 25, and FIG. 28, in another embodiment, the acupressure device 200 comprises the pair of arms (102, 104). Each arm (102, 104) comprises the first end portion 106, the second end portion 108, and the arm portion 110 extending from the first end portion 106 and the second end portion 108. The arm portion 110 comprises the concave portion 110A and the convex portion 110B. Further, the arm portion 110 comprises the intermediate portion 110C between the concave portion 110A and the convex portion 110B.

The device 200 further comprises the fulcrum 112 extends between the convex portion 110B of the pair of arms (102, 104) and pivotally connects the pair of arms (102, 104). The fulcrum 112 allows the pairs of arms (102, 104) to move outward and inward relative to each other. In one embodiment, the fulcrum 112 is the living hinge.

The device 200 further comprises the spring 114 extends between the second end portion 108 of the pair of arms (102, 104). Referring to FIG. 24 and FIG. 25, the spring 114 in the relaxed position maintains the arm (102, 104) in the closed position and referring to FIG. 28, the spring 114 in an activated position enables movement of the arms (102, 104) outwards and maintains the arm (102, 104) in an open position. The spring 114 comprises the V-shaped portion having the first end and the second end. The first end is connected to one arm 102 and the second end is connected to another arm 104.

The device 200 comprises a first leg 154 and a second leg 156. The first leg 154 extends from an interior surface of the second end portion 108 of one arm 102 and first end of the spring 114. The second leg 156 extends from an interior surface of the second end portion 108 of another arm 104 and the second end of the spring 114. The first leg 154 lies in a first plane and the second leg 156 lies in a second plane. The first plane is adjacent to the second plane so that a portion of first leg 154 abuts against a portion of the second leg 156. The first leg 154 and the second leg 156 are made of flexible material. Further, the first leg 154, the second leg 156 and the spring 114 together forms a closed loop. The first leg 154 and the second leg 156 further comprise one or more guiding protrusions 158. The guiding protrusion 158 is configured to align the first leg 154 and the second leg 156 during compression when the keyring 164 is inserted into the closed loop of the device 200.

The device 200 comprises the pressure management assembly comprising the band 116 configured to encircle over the pair of arms (102, 104) and apply inward pressure over the arms (102, 104). Thereby, biasing the arms (102, 104) toward each other to ensure consistent contact with the target area. The band 116 is configured to fix over the concave portion 110A to increase the inward pressure and the band 116 is configured to fix over the convex portion 110B to decrease the inwards pressure. The band 116 comprises a groove 124 extending along a circumference of an interior surface of the band 116. The groove 124 of the band 116 is disposed over the protruding member to manage application of pressure and securely lock with the protrusion member.

The pressure management assembly further comprises one or more protruding members (122A, 122B) including the set of first protruding members 122A and the set of second protruding members 122B. The first protruding members 122A are arranged from the intermediate portion 110C to the portion of the concave portion 110A. In one embodiment, the band 116 is disposed over spaces between the first protruding members 122A to manage application of pressure. Further, the first protruding members 122A comprises the side surface having the flat configuration 126. The flat configuration 126 of the first protruding member 122A is configured to prevent movement of the band 116. The second protruding members 122B are arranged from the intermediate portion 110C to the portion of the convex portion 110B. Further, the second protruding members 122B comprises a top surface having a rounded configuration 128.

The device 200 further comprises at least one of the first and second connecting member (152, 153) configured to connect the first end portion 106 to the concave portion 110A of respective arm (102, 104). In another embodiment, the first end portion 106 is integrally connected to the concave portion 110A of respective arm (102, 104).

The first end portion 106 comprises a contact pad assembly and the second end portion 108 defines the handle 120 of the device 200. In one embodiment, an external surface of a contact pad 166 and the handle 120 comprises one or more ribs 160. The ribs 160 on the contact pads 166 provide grip and stability that prevent the slippage during therapeutic pressure application. The handle 120 enables a user to apply pressure at the second end portion 108 of the arms (102, 104) to activate the spring 114 to move the arms (102, 104) to an open position to fix over a desired pressure point. Before application and engagement of the device 200, the band 116 is adjusted to manage pressure at the desired pressure point.

Referring to FIG. 24, at least one of the first leg 154 and the second leg 156 flexes to receive a keyring 164 over the legs (154, 156). The first leg 154 and the second leg 156 smoothly glide over each other when pressure is applied on the second end portion 108 of the arms (102, 104) that enables to lock the keyring 164 with the legs (154, 156). The locking legs (154, 156), positioned on different planes, glide over each other smoothly when pinched together, ensuring secure functionality. The locking mechanism secures the keyring 164 within the closed loop formed by the legs (154, 156) and the spring 114. The device 200 enhances portability and functionality. The first leg 154 and the second leg 156 further comprise one or more guiding protrusions 158 that ensure smooth inward flexing and alignment of the first leg 154 and second leg 156 during attachment of the key-ring 164. The device 200 with key-ring 164 retains the therapeutic functionality of the device 100 while providing additional features for everyday convenience.

Figure 26:
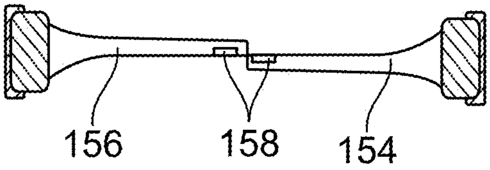
FIG. 26 exemplarily illustrates a cross-section of the first leg abutting against the second leg of the acupressure device of FIG. 25 along a section F-F.

FIG. 26 exemplarily illustrates a rear view of the second end portion 108, where the first leg 154 is oriented towards or aligned with the second leg 156 of the acupressure device 200 in the relaxed position.

Figure 27:
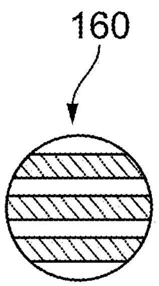
FIG. 27 exemplarily illustrates a cross-section of a ribbed surface of a contact pad of FIG. 24 along a section G-G.

FIG. 27 exemplarily illustrates a side view of a cross-section of the ribbed surface of the contact pad 166 of device 200, and the ribbed surface of the handle 120 of device 200 in FIG. 24, FIG. 25, and FIG. 28. The ribbed surface on the contact pads 166 in device 200 provides stability that prevents slippage during therapeutic pressure application. Further, the ribbed surface 160 of the contact pad 166 of device 200 ensures secure placement and user comfort while targeting the LI-4 (Hegu) pressure point and ergonomic efficiency.

Figure 29:
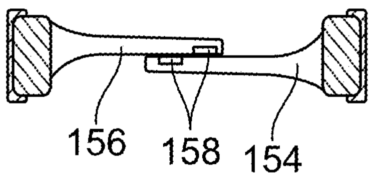
FIG. 29 exemplarily illustrates a cross-section of the first leg abutting against the second leg of the acupressure device of FIG. 28 along a section H-H.

FIG. 29 exemplarily illustrates a rear view of the second end portion 108, where the first leg 154 is oriented towards or aligned with the second leg 156 of the acupressure device 200 in the engaged position. The first leg 154 and the second leg 156 smoothly glide over each other when pressure is applied on the second end portion 108 of the arms (102, 104).

The embodiment of device 200 operates in the same manner as device 100, as described in the disclosure corresponding to FIGS. 21 to 23. Accordingly, FIGS. 21 to 23 should be referred to for understanding the operation of device 200.

The device 200 is compact and designed to attach securely to the key-ring 164 or other accessories, ensuring it is always accessible to the user. The flexible locking legs (154, 156) slide together with slight friction, ensuring a controlled and secure attachment to the keychain 164. They feature guiding protrusions 158 for proper key-ring 164 alignment, which prevent misalignment and ensure reliable operation. The legs (154, 156) are positioned on different planes, enabling them to lightly touch and glide over each other when squeezed, providing a secure and stable locking mechanism. Unlike the detachable contact pads 118 in the embodiment of device 100, the device 200 with ribbed contact pads 166 are molded directly into the nylon body. The ribs 160 prevent slippage and ensure consistent therapeutic pressure during use. The device 200 combines portability with therapeutic functionality. The integration of ribbed contact pads 166, guiding protrusions 158, and a secure locking mechanism ensures both stable performance during therapeutic use and convenient attachment as a portable accessory. The streamlined design makes this model practical, effective, and suitable for daily use.

The device 200 is positioned so the "pinch" structure straddles the hand valley, ensuring the contact pad 166 aligns with the LI-4 point. Users adjust the silicone band 116 to their desired pressure level. The device 200 is worn for 3-15 minutes while users continue with daily activities. The spring 114 mechanism maintains consistent therapeutic pressure regardless of hand movements. Users may fine-tune pressure levels during the session by disengaging the device from the hand and sliding the silicone ring to different settings.

Advantageously, the device (100, 200) is designed to apply targeted pressure to acupoints on the body for relief from headaches, migraines, and related conditions. The invention is particularly suited for applications involving the LI-4 (Hegu) acupressure point located on the hand. The present invention is uniquely designed for user comfort, allowing adjustments in the pressure pad to suit user preferences, providing a consistent and tailored acupressure experience. The device 100 and 200 comprises a user-centric design combined with therapeutic functionality to the user. The oversized handles 120 are designed to provide increased mechanical advantage, enabling users, including those with weak or impaired hands, to easily install or remove the device (100, 200), even under tight pressure settings. The handle 120 has unique non-slip features on device 100 and device 200, which enhances control and stability during operation. The integration of the guiding protrusions 158 on the first leg 154 and the second leg 156 with the locking mechanism ensures convenient attachment for a portable accessory. The spring 114 is of nylon provides consistent baseline pressure to the target point. The baseline of spring 114 compression adapts naturally to the user movement, maintaining therapeutic pressure without requiring constant readjustment. With the adjustment of the band 116 on the device (100, 200) toward the handle 120 ends, users can reduce the applied pressure below the baseline of the spring 114. The reduced applied pressure helps the users with heightened sensitivity to pressure, providing versatility for different therapeutic needs. Alternatively, the adjustment of the band 116 on the device (100, 200) away from the handle 120, allows for users to increase the applied pressure above the baseline of the spring 114.

The primary structure of the device (100, 200) is constructed from durable, flexible nylon. Nylon was selected for its strength, lightweight properties, and resistance to wear from repeated use. The device (100, 200) forms a "pinch" structure that comfortably fits between the thumb and index finger, adapting to various hand sizes and user preferences.

The device (100, 200) operates on a principle similar to a traditional clothes pin. The fulcrum 112 is made of molded nylon material. The built-in molded nylon spring 114 provides baseline compression between the arms (102, 104), ensuring consistent pressure on the targeted LI-4 point. The inner surfaces of the arms (102, 104) incline slightly outward to create a comfortable and secure fit when closed. This design enables the device (100, 200) to open wide, accommodating varied hand anatomies and ensuring effective contact with the LI-4 point.

The contact pads 166 of device 200 are molded as an integral part of the nylon body, reducing the number of parts and assembly requirements. This innovation lowers manufacturing costs and makes the device 200 more affordable for end users.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An acupressure device, comprising:

a pair of arms, each arm comprising a first end portion, a second end portion, and an arm portion extending from the first end portion and the second end portion, wherein the arm portion comprises a concave portion, a convex portion, and an intermediate portion extending between the concave portion and the convex portion;

a fulcrum extending between the convex portion of each of the pair of arms and pivotally connecting the pair of arms, wherein the fulcrum allows the pair of arms to move outward and inward relative to each other;

a spring extending between the second end portion of each of the pair of arms, wherein the spring, in a relaxed position, maintains the pair of arms in a closed position and the spring, in an activated position, enables movement of the pair of arms outwards and maintains the pair of arms in an open position, and a pressure management assembly comprising a pressure band configured to encircle over the pair of arms and apply inward pressure over the pair of arms, thereby biasing the pair of arms toward each other to ensure consistent contact with a target area, wherein the pressure band is configured to slide over the pair of arms to precisely adjust a pressure to predefined pressure levels, and is configured to enable consistent reproduction of a therapeutic pressure specific to a user's needs, wherein the pressure management assembly further comprises one or more protruding members including a set of first protruding members and a set of second protruding members on each of the pair of arms, wherein the set of first protruding members are arranged from the intermediate portion to a portion of the concave portion on each of the pair of arms and wherein the set of second protruding members are arranged from the intermediate portion to a portion of the convex portion on each of the pair of arms;

wherein each of the first end portions comprise a contact pad assembly and each of the second end portions define a handle of the device, wherein the handle is configured to enable the user to apply pressure at each of the second end portions of the pair of arms to activate the spring to move the pair of arms to the open position to fix over a desired pressure point, wherein, after application of the device, the pressure band is configured to be adjusted to manage pressure at the desired pressure point.

2. The acupressure device of claim 1, wherein the pressure band comprises a groove extending along a circumference of an interior surface of the pressure band, wherein, when the pressure band is disposed over the one or more protruding members to manage application of pressure, the groove of the pressure band is configured to lock with the one or more protruding members.

3. The acupressure device of claim 1, wherein the set of first protruding members comprise a side surface having a flat configuration and the set of second protruding members comprise a top surface having a rounded configuration.

4. The acupressure device of claim 3, wherein, when the pressure band is disposed over spaces between the set of first protruding members to manage application of pressure, the flat configuration of the set of first protruding members is configured to prevent movement of the pressure band.

5. The acupressure device of claim 1, wherein the fulcrum is a living hinge configured to allow each of the contact pad assemblies to self-level and provide consistent pressure across all points on each contact pad assembly.

6. The acupressure device of claim 1, wherein an exterior surface of the handle comprises a textured surface, which is a non-slip grip that is configured to enhance control and stability during operation.

7. The acupressure device of claim 1, wherein each contact pad assembly comprises:

a first support member disposed over the first end portion of each respective arm;

a second support member that comprises a cylindrical member having a first hollow inner portion and at least two parallel slits extending from one end of the cylindrical member, wherein the first hollow inner portion is complementary to the first support member, wherein the second support member is configured to be locked over the first support member by sliding the cylindrical member over the first support member, wherein an exterior surface of the cylindrical member comprises one or more spaced apart ribs extending along a length of the cylindrical member, and a contact pad comprising a second hollow inner portion complementary to the cylindrical member of the second support member, wherein the second hollow inner portion is configured to be fixed over the cylindrical member to lock the contact pad with the second support member, wherein the contact pad is configured to be detachably attached to the first end portion of each of the pair of arms to facilitate interchanging of the contact pad by the user.

8. The acupressure device of claim 1, wherein the contact pad assembly comprises a third support member disposed over the first end portion of each respective arm, wherein the third support member comprises a cylindrical portion and plurality of collapsible fins extending from an exterior surface of the cylindrical portion, wherein a contact pad of the contact pad assembly comprises a hollow inner portion configured to lock the contact pad with the third support member.

9. The acupressure device of claim 7, wherein each contact pad is a faceted magnetized Hematite pad.

10. The acupressure device of claim 1, wherein the spring comprises a V-shaped portion having a first end and a second end, wherein the first end is connected to one arm of the pair of arms and the second end is connected to the other arm of the pair of arms, wherein the spring and the pressure band are configured to provide the therapeutic pressure in a consistent, constant manner.

11. The acupressure device of claim 1, wherein at each respective arm of the pair of arms, the first end portion is integrally connected to the concave portion.

12. The acupressure device of claim 1, further comprising a first connecting member configured to connect the first end portion to the concave portion of each respective arm, wherein the first connecting member comprises a cylindrical configuration, wherein the first connecting member is a living hinge configured to pivot 360-degrees, and configured to enable the contact pad assembly to adjust to the user's hand contours.

13. The acupressure device of claim 1, further comprising a second connecting member configured to connect the first end portion to the concave portion of each respective arm to enable controlled back-and-forth pivoting of the contact pad assembly along a single axis ensuring precise alignment during use, wherein the second connecting member comprises a rectangular configuration.

14. The acupressure device of claim 1, further comprising:

a first leg extending from an interior surface of the second end portion of one arm of the pair of arms and a first end of the spring, and a second leg extending from an interior surface of the second end portion of the other arm of the pair of arms and a second end of the spring, wherein the first leg lies in a first plane and the second leg lies in a second plane, wherein the first plane is adjacent to the second plane so that a portion of the first leg is oriented towards or aligned with the second leg, wherein the first leg and the second leg are made of flexible material, wherein the first leg, the second leg and the spring together form a closed loop, wherein at least one of the first leg and the second leg flexes to receive a keyring over the first leg and the second leg and releases to lock the first leg and the second leg, thereby securing the keyring within the closed loop.

15. The acupressure device of claim 14, wherein the first leg and the second leg comprise one or more guiding protrusions, wherein the one or more guiding protrusions are configured to guide the keyring through the first leg or the second leg, and are configured to ensure proper alignment and configured to prevent misplacement of the keyring on the pair of arms.

16. The acupressure device of claim 1, wherein the pressure band is configured to fix over the concave portion of each of the pair of arms to increase the inward pressure, wherein the pressure band is configured to fix over the convex portion of each of the pair of arms to decrease the inward pressure, wherein the pressure band is configured to fix over the intermediate portion of each of the pair of arms for neutral pressure, wherein the device comprises visual markings in the pair of arms to indicate different pressure levels based on a position of the pressure band on the pair of arms.

17. The acupressure device of claim 1, wherein the second end portion and the contact pad assembly of each of the pair of arms comprises one or more ribs to prevent slippage and maintain consistent therapeutic application.

18. The acupressure device of claim 1, wherein the pressure band is made of silicone material and the spring is made of nylon material.

19. The acupressure device of claim 1, wherein the device is made of nylon material.

* * * * *